United States Patent [19]

Magenheim

[11] 4,054,255
[45] Oct. 18, 1977

[54] MICROWAVE ICE DETECTOR

[75] Inventor: Bertram Magenheim, Bethesda, Md.

[73] Assignee: System Development Corporation, Santa Monica, Calif.

[21] Appl. No.: 672,616

[22] Filed: Apr. 1, 1976

[51] Int. Cl.² .................................................. B64D 15/20
[52] U.S. Cl. .............................. 244/134 F; 73/170 R; 73/178 H; 324/58.5 B; 340/234
[58] Field of Search .......... 244/134 R, 134 D, 134 F; 73/170 R, 178 H; 324/58.5 B; 416/95; 340/234; 343/704

[56] References Cited

U.S. PATENT DOCUMENTS 3,836,846  9/1974  Overall et al. .................. 340/234 X Primary Examiner—Trygve M. Blix
Assistant Examiner—Barry L. Kelmachter Attorney, Agent, or Firm—Fulwider, Patton, Rieber, Lee & Utecht

[57] ABSTRACT

A system for detecting ice on exterior surfaces of aircraft by transmitting a relatively low power microwave electromagnetic signal into a dielectric layer functioning as a surface waveguide, and monitoring the signals transmitted into and reflected from the waveguide. The waveguide includes a termination element which is mismatched with the waveguide impedance, resulting in partial or total reflection of the microwave energy from the remote end of the waveguide. As ice builds up on the surface waveguide, the impedance or reflection characteristics of the composite waveguide comprising the ice layer and the permanent surface waveguide give a reliable indication of the presence and location of the ice. The reflection characteristics are conventionally monitored utilizing a dual directional coupler and a reflectometer.

5 Claims, 5 Drawing Figures

MICROWAVE ICE DETECTOR

BACKGROUND OF THE INVENTION

The present invention relates generally to surface ice detection systems, and, more particularly, to ice detectors for use in aircraft.

The problems relating to the formation of ice on aircraft are well known, and date from the early days of aviation. In certain climatic conditions, ice has a tendency to form, especially in the vicinity of the leading edges of airfoil surfaces, in sheets of substantial thickness. The ice not only increases the effective weight of the aircraft, but it can also increase drag resistance and reduce the lift provided by the airfoil.

Various techniques have been employed in the past for the detection of ice, but have all proved unreliable for one reason or another. One prior art method of ice detection is known as the orifice or pressure-probe method, and utilizes forward facing orifices, the formation of ice on the orifices being detected as a decrease in pressure. Other ice detection techniques depend on the detection of a variation in a particular mechanical or electrical parameter, such as electrical or heat conductivity, or the attenuation of light passed through the ice. While some of these techniques may operate reasonably satisfactorily on fixed-wing aircraft, there are additional problems posed by the detection of ice on helicopters. Typically helicopters are used at lower altitudes, and are more likely to encounter icing conditions than modern fixed-wing aircraft. Moreover, many of the prior art techniques are incapable of being adapted for use on rotating surfaces. Consequently, no completely satisfactory method has heretofore been available for the detection of ice on helicopter rotor blades.

It will be apparent from the foregoing that there exists a clear need for an ice detection system which can reliably indicate the presence of ice on aircraft, and particularly on rotor blades of helicopters. The present invention fulfills this need.

SUMMARY OF THE INVENTION

The present invention resides in an aircraft ice detector, and a related method for its use, in which microwave electromagnetic energy is transmitted into a surface layer of ice, and the reflection or impedance characteristic of the ice layer is monitored to determine the presence and amount of the ice. Basically, and in general terms, the apparatus of the invention includes means for generating microwave electromagnetic energy, coupling means, for coupling the microwave energy for transmission into the surface layer of ice in such a manner as to propagate the energy through the ice layer acting as a surface waveguide, and signal monitoring means, such as a reflectometer, for monitoring the microwave energy transmitted to and reflected from the ice layer, and thereby determining the presence and relative amount of ice in the layer.

The apparatus of the invention also includes a permanent surface waveguide of such a thickness as to allow the propagation of microwave energy even when the ice layer is extremely thin. The permanent surface waveguide material is selected to have a dielectric constant approximately equal to that of ice and to be a relatively low-loss material for the transmission of microwave energy.

In accordance with another aspect of the invention, there is included a mismatch element, such as a short-circuit element, at the end of the surface waveguide remote from the end into which the microwave energy is transmitted. The mismatch element results in a partial or total reflection of the energy back along the surface waveguide, the reflected energy being detected by the reflectometer means. Since the ice will typically contain many impurities, including a significant amount of unfrozen water, it will present a lossy dielectric medium for the transmission of the microwave energy, and much less energy will be reflected out of the composite waveguide, comprising the ice and the permanent surface waveguide, when a layer of ice is present.

Not enough energy is supplied to the ice layer to heat or melt the ice to any significant degree, but the ice detector of the present invention is well suited for use in conjunction with a microwave signal source of a greater strength, which would be actuated on the detection of a significant or predetermined amount of ice, and which would operate to heat the ice and effect its removal. Alternatively, the invention has independent application as an ice detector, without regard to the type of deicing apparatus used.

The method of the present invention basically comprises the steps of generating a relatively low-power microwave signal, coupling the microwave signal for transmission through a surface ice layer acting as a surface waveguide, and monitoring the energy transmitted into and reflected from the ice layer, to determine the presence and relative amount of ice.

It will be apparent that the present invention represents a significant advance in the field of ice detection systems. In particular, the use of microwave energy transmitted through the ice acting as a surface waveguide, and the monitoring of the reflection characteristic of the ice layer, allows the presence and amount of ice to be reliably and accurately determined. Other aspects and advantages of the invention will become apparent from the following more detailed description taken in conjunction with the accompanying drawings.

DESCRIPTION OF THE PREFERRED EMBODIMENT

Figure 1:
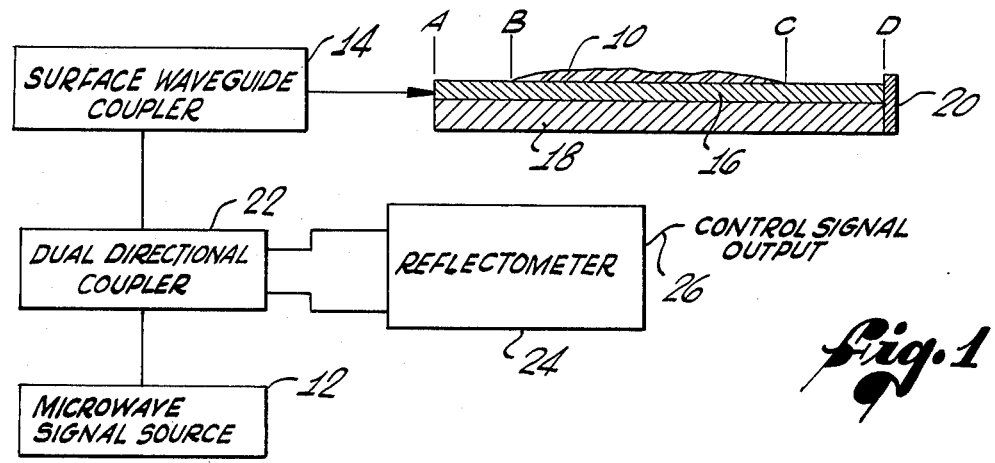
FIG. 1 is a diagrammatic view of the ice detection system of the present invention.

As shown in the drawings for purposes of illustration, the present invention is principally concerned with a novel technique for the detection of ice layers formed on exterior surfaces of aircraft. It is particularly well-suited to the detection of ice on airfoil surfaces of both fixed-wing and rotating-wing aircraft.

In accordance with the invention, an ice layer, indicated by reference numeral 10, is detected by transmitting into it microwave electromagnetic energy supplied from a conventional microwave signal source 12, and coupled to the ice by means of a surface waveguide coupler 14 in such a manner that the ice layer functions as a surface waveguide. The ice layer 10 is formed on a permanent dielectric layer 16 which also functions as a surface waveguide, the dielectric layer 16 being formed on an aircraft surface 18, typically of metal, on which ice is expected to accumulate. A microwave short-circuit element 20 is installed at the end of the waveguide 16 remote from the surface waveguide coupler 14, to ensure reflection of microwave energy back along the waveguide. A dual directional coupler 22 is used to couple the microwave energy from the signal source 12 to the surface waveguide coupler 14, and to supply a signal to a reflectometer 24 connected to the dual directional coupler 22. The reflectometer monitors the complex value of the impedance or reflection characteristic of the composite waveguide comprising the ice layer 10 and permanent surface waveguide 16.

Figure 3:
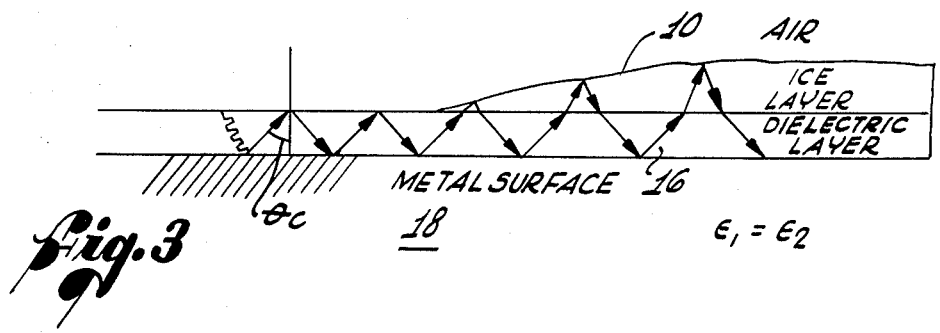
FIG. 3 is a diagrammatic representation of the transmission of microwave energy through the permanent surface waveguide and an ice layer on an aircraft surface.

Waveguides taking the form of closed tubes of circular or rectangular cross section are well known. Less familiar is the concept of an "open boundary" structure for transmitting microwave energy along a surface. The energy is closely bound to the surface, and although electric or magnetic fields persist outside of the waveguide, they decrease exponentially in a direction normal to the surface. Propagation of microwave energy through a surface waveguide occurs in what are commonly known as "trapped" modes of transmission, which can be considered equivalent to total internal reflection from the surface boundaries of the waveguide. As shown in FIG. 3, the microwave energy can be thought of as being launched into the permanent surface waveguide 16 in such a manner that the angle of incidence with the surface boundaries, i.e., with the ice-air interface, and the dielectric metal interface, exceeds the critical angle above which total internal reflection will take place.

The frequency of operation of the apparatus of the invention is not critical and can be selected to meet specific design requirements, and to conform with relevant governmental regulations. Typical frequencies would fall in the range 2,000–22,000 megahertz. The signal source 12 can be operated continuously, i.e., in "continuous-wave" mode, or can be adapted for pulsed operation.

Figure 2:
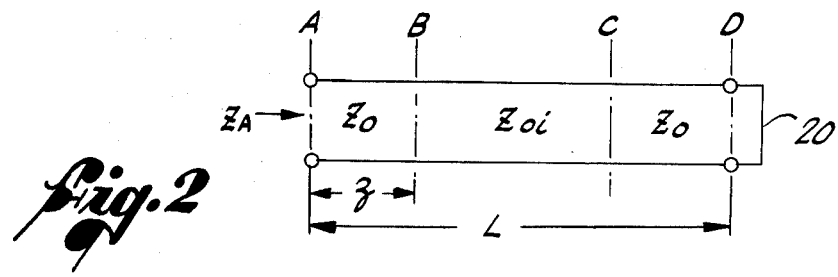
FIG. 2 is an equivalent circuit diagram for the composite surface waveguide formed by an ice layer and a permanent surface waveguide.

FIG. 2 is an equivalent circuit diagram showing the composite waveguide as being equivalent to a transmission line short circuited at its remote end by the element 20. In FIGS. 1 and 2 the letter A is used to indicate the input end of the composite waveguide, B is used to indicate the location at which the ice layer begins, C is used to indicate the location in which the ice layer ends, and D is used to indicate the short-circuited end of the waveguide.

The material of the permanent surface waveguide 16 is selected to have a dielectric constant approximately equal to that of ice, so that little refraction occurs at the ice-dielectric interface, and to have a relatively lossless dielectric characteristic.

The material should also be selected for its ability to withstand severe rain, sand and dust erosion. This is particularly important if the ice detector is to be used on helicopter rotor blades. Suitable materials are alumina; an ultra-high molecular weight polyethylene, such as one sold under the trademark LENNITE; high quartz fiber silicone resin laminates; fused quartz; or epoxy glass or silicone glass laminates. In addition, a polyurethane erosion coat, of approximately 0.012 inch thickness, may be used as an erosion coat over some of these materials. The dielectric properties of polyurethane render it unsuitable for use alone as a waveguide material.

One way of expressing the relative impedance characteristics of a transmission line is in terms of a dimensionless reflection coefficient, which will be a mathematically complex quantity having real and imaginary components. Since the permanent surface waveguide 16 is of relatively lossless material, and since the reflecting element 20 can be selected to provide almost total reflection, the reflection coefficient detected by means of the dual direction coupler 22 and the reflectometer 24 will have a magnitude of practically unity when no ice layer 10 is present. There will, however, be a substantial phase difference between the transmitted and reflected signals.

The accretion of the ice layer 10 on the dielectric layer 16 introduces a relatively lossy component into the dielectric waveguide, as indicated by the impedance $Z_{0i}$ between the positions B and C in FIG. 2. The energy propagated through the composite waveguide will then be subject to a substantial loss in magnitude as well as a substantial phase shift, resulting in a reflection coefficient having a magnitude of substantially less than unity, and a phase angle different from the one observed in the absence of the ice layer. As the accretion of ice continues, the reflection coefficient as measured by the reflectometer 24 will change in both magnitude and phase until a relatively small reflection coefficient obtains. The specific values of reflection coefficients detected by the dual directional coupler 22 and reflectometer 24 will depend, of course, on the specific parameters of the ice detector.

The reflectometer 24 can be coupled, as shown at 26, to generate a control signal output indicative of the reflection coefficient measured by the reflectometer. The reflection coefficient, or a component thereof, can be displayed directly on indicating means (not shown) calibrated directly in terms of amount of ice, or relative position of ice, since the relative phase shift of the reflection coefficient will be related to the position of the ice with respect to the entire permanent surface waveguide 16. Alternatively, or in addition, the value of the reflection coefficient could be compared with a threshold value, preselected during calibration of the instrument, and a control signal generated to actuate deicing equipment when the reflection coefficient reaches the threshold value.

Figure 4:
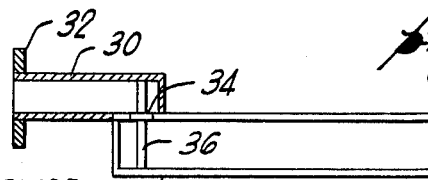
FIG. 4 is an elevational view, partly in section, of a coupler used to transmit microwave energy into the surface waveguide.
Figure 5:
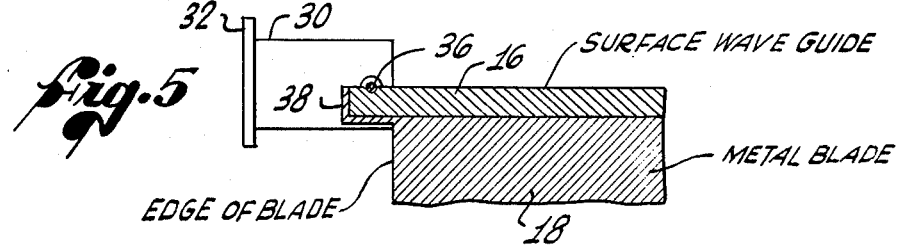
FIG. 5 is a plan view, partly in section, corresponding to the elevational view of FIG. 4.

FIGS. 4 and 5 show a surface waveguide coupler corresponding to that referred to by reference numeral 14 in FIG. 1. The coupler 14 includes a conventional rectangular waveguide 30 having a flanged end 32 for coupling to the dual directional coupler 22 or other conventional microwave distribution components (not shown). At its end opposite the flange 32, the waveguide 30 is closed except for a circular aperture 34 in one sidewall through which a coupling pin 36 projects, the pin being attached to the sidewall opposite the aperture. The pin 36, as best shown in FIG. 5, overlies and is partly embedded in the surface waveguide 16. The metal surface 18 includes a portion which encloses the end of the surface waveguide 16, as shown at 38, to act as a reflector and thereby to effect radiation of the microwave energy in the desired direction along the waveguide 16. It will be appreciated that some of the microwave energy reflected from the reflecting element 20 and directed back along the waveguide 16 will again be reflected by the portion 38 of the metal surface 18, resulting in a series of complex multiple reflections back and forth along the waveguide. Some resultant component of the energy originally transmitted into the waveguide 16 through the coupler 14 will, however, be reflected back out of the coupler 14 for detection by the dual directional coupler 22 and the reflectometer 24.

For use of the invention to detect ice on helicopter rotor blades, the microwave signal source 12 may, because of its low power requirements, be mounted for rotation with the rotor blades, together with the dual directional coupler 22, reflectometer 24 and surface waveguide coupler 14. Alternatively, the microwave signal source 12 could be mounted in the body of the helicopter and also used to supply larger amounts of power to deice the rotor blades. This arrangement would require the addition of a rotary joint and a number of other conventional microwave distribution components, none which is illustrated, to transmit the microwave energy to the rotor blade surfaces.

It will be appreciated from the foregoing that the present invention represents a significant advance in the field of ice detection systems. In particular, the use of microwave energy of relatively low power to detect the reflection or impedance characteristic of a composite waveguide comprising a lossless waveguide and a surface ice layer, results in the reliable detection of the presence, amount and position of the ice layer on the waveguide, as well as its rate of accretion. It will also be appreciated that, although a particular embodiment of the invention has been described in detail for purposes of illustration, various changes and modifications may be made without departing from the spirit and scope of the invention. Accordingly, the invention is not to be limited except as by the appended claims.

I claim:

1. Aircraft ice detection apparatus, comprising:
    a source of microwave electromagnetic energy;
    surface waveguide coupling means for coupling the microwave energy to a surface layer of ice in such a manner that the ice functions as a surface waveguide and the energy is transmitted along the layer in a direction substantially parallel with the layer and with the surface on which it is formed, and is at least partially reflected back to said coupling means on reaching the end of the ice layer;
    signal monitoring means for comparing microwave signals transmitted into and reflected from the ice layer;
    whereby variations in the amount of ice result in corresponding variations in the reflected energy signal.

2. Aircraft ice detection apparatus, comprising:
    a surface waveguide of dielectric material overlying a surface to be deiced;
    a source of microwave electromagnetic energy;
    a surface waveguide coupler for coupling the microwave energy to said surface waveguide;
    a dual directional coupler connected between said microwave energy source and said surface waveguide coupler to monitor the transmission of energy in both directions; and
    reflectometer means coupled with said dual directional coupler, to monitor the relationship between the microwave energy transmitted into said waveguide and the energy reflected from said waveguide;
    whereby the reflection characteristics of said surface waveguide will be modified by the presence of ice thereon and said reflectometer means is indicative of the presence of ice.

3. Apparatus as set forth in claim 2, and further including waveguide terminating means operative to reflect at least partially the energy transmitted along said surface waveguide.

4. A method of detecting ice on exterior surfaces of aircraft, comprising the steps of:
    generating a microwave electromagnetic signal;
    coupling the microwave signal to a permanent surface waveguide of dielectric material having a dielectric constant approximately the same as that of ice;
    transmitting the microwave signal along the surface waveguide in a direction substantially parallel with a surface on which ice is to be detected;
    reflecting at least a portion of the microwave energy back along the waveguide from its remote end; and
    detecting in a reflectometer a ratio between transmitted and reflective energy with respect to the waveguide;
    whereby accretion of ice on the surface waveguide results in a different reflection characteristic of the composite waveguide comprising the ice layer and the permanent surface waveguide, and the presence and location of ice may be detected by means of the reflectometer.

5. Aircraft ice detection apparatus, comprising:
    a source of microwave electromagnetic energy:
    surface waveguide coupling means for coupling the microwave energy to a surface layer of ice in such a manner that the ice functions as a surface waveguide, said surface waveguide coupling means including a permanent surface waveguide of dielectric material overlying a surface on which the presence of ice is to be detected, and further including means for coupling the microwave energy to said permanent surface waveguide in such a manner that the energy is transmitted along said permanent surface waveguide and along any ice layer formed there on, as a composite surface waveguide; and
    signal monitoring means for comparing the microwave signals transmitted into and reflected from the ice layer;
    whereby variations in the amount of ice result in corresponding variations in the amount of reflected energy.

* * * * *